United States Patent
Wu

(10) Patent No.: US 9,277,437 B2
(45) Date of Patent: Mar. 1, 2016

(54) METHOD OF HANDLING MBMS MDT IN WIRELESS COMMUNICATION SYSTEM

(71) Applicant: HTC Corporation, Taoyuan County (TW)

(72) Inventor: Chih-Hsiang Wu, Taoyuan (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 0 days.

(21) Appl. No.: 14/596,231

(22) Filed: Jan. 14, 2015

(65) Prior Publication Data

US 2015/0201344 A1 Jul. 16, 2015

Related U.S. Application Data

(60) Provisional application No. 61/926,972, filed on Jan. 14, 2014.

(51) Int. Cl.
| | | |
|---|---|---|
| H04H 20/71 | (2008.01) | |
| H04W 24/10 | (2009.01) | |
| H04W 24/02 | (2009.01) | |
| H04L 12/18 | (2006.01) | |
| H04W 72/00 | (2009.01) | |
| H04W 4/06 | (2009.01) | |

(52) U.S. Cl.
CPC .............. *H04W 24/10* (2013.01); *H04L 12/189* (2013.01); *H04W 24/02* (2013.01); *H04W 72/005* (2013.01); *H04W 4/06* (2013.01)

(58) Field of Classification Search
CPC ....... H04W 24/10; H04W 4/06; H04W 24/02; H04W 72/005; H04L 12/189
See application file for complete search history.

(56) References Cited

U.S. PATENT DOCUMENTS

| | | | |
|---|---|---|---|
| 2013/0010624 A1* | 1/2013 | He et al. .................... | 370/252 |
| 2013/0016649 A1* | 1/2013 | Damnjanovic et al. ....... | 370/315 |
| 2013/0021932 A1* | 1/2013 | Damnjanovic et al. ....... | 370/252 |
| 2013/0128756 A1* | 5/2013 | Zhang et al. .................. | 370/252 |
| 2013/0242785 A1* | 9/2013 | Guo .............................. | 370/252 |
| 2014/0126403 A1* | 5/2014 | Siomina ........................ | 370/252 |
| 2014/0128115 A1* | 5/2014 | Siomina et al. ............... | 455/501 |
| 2014/0301210 A1* | 10/2014 | KIM et al. .................... | 370/241 |

FOREIGN PATENT DOCUMENTS

EP 2528270 A1 11/2012

OTHER PUBLICATIONS

European Search report issued on May 7, 2015 for EP application No. 15151171.4.

(Continued)

*Primary Examiner* — Clemence Han
(74) *Attorney, Agent, or Firm* — Winston Hsu; Scott Margo

(57) ABSTRACT

A method of handling a multimedia broadcast multicast service (MBMS) minimization of driver test (MDT) for a network of a wireless communication system includes transmitting a first MBMS measurement configuration to instruct a first user equipment (UE) to perform an MBMS MDT operation; receiving a first MBMS measurement result and a first multicast-broadcast single frequency network (MBSFN) area identity (ID) which indicates that the first MBMS measurement result is generated for a first MBSFN area identified by the first MBSFN area ID, from the first UE; and processing the first MBMS measurement result according to the first MBSFN area ID.

16 Claims, 5 Drawing Sheets

(56) References Cited

OTHER PUBLICATIONS

Office action mailed on May 26, 2015 for the European application No. 15151171.4, pp. 1-6.

Verizon, "Revised Work Item Proposal: Further MBMS Operations Support for E-UTRAN", 3GPP TSG RAN Meeting #61, RP-131681, Dec. 3-6, 2013, Busan, Korea, pp. 1-5.

3GPP TS 36.300 V11.8.0 (Dec. 2013), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", pp. 1-209.

3GPP TS 36.331 V11.6.0 (Dec. 2013), "3rd Generation Partnership Project; Technical Specification Group Radio Access Network; Evolved Universal Terrestrial Radio Access (E-UTRA); Radio Resource Control (RRC); Protocol specification (Release 11)", pp. 1-349.

3GPP TS 37.320 V11.3.0 (Mar. 2013), "3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 11)", pp. 1-23.

\* cited by examiner

METHOD OF HANDLING MBMS MDT IN WIRELESS COMMUNICATION SYSTEM

CROSS REFERENCE TO RELATED APPLICATIONS

This application claims the benefit of U.S. Provisional Application No. 61/926,972, filed on Jan. 14, 2014 and entitled "Method and Apparatus for handling MBMS MDT logging in a wireless communication system", the contents of which are incorporated herein by reference.

BACKGROUND OF THE INVENTION

1. Field of the Invention

The present invention relates to a method utilized in a wireless communication system, and more particularly, to a method for handling a multimedia broadcast multicast service (MBMS) minimization of driver test (MDT) in a wireless communication system.

2. Description of the Prior Art

A long-term evolution (LTE) system supporting the 3rd Generation Partnership Project (3GPP) Rel-8 standard and/or the 3GPP Rel-9 standard is developed by the 3GPP as a successor of a universal mobile telecommunication system (UMTS) for further enhancing performance of the UMTS to satisfy increasing needs of users. The LTE system includes a new radio interface and a new radio network architecture that provide high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques such as carrier aggregation (CA), coordinated multipoint (CoMP) transmission/reception, uplink (UL) multiple-input multiple-output (MIMO), etc. For a UE and an eNB to communicate with each other in the LTE-A system, the UE and the eNB must support standards developed for the LTE-A system, such as the 3GPP Rel-10 standard or later versions.

Multimedia broadcast multicast service (MBMS) service or evolved MBMS (E-MBMS) service has been introduced in the UMTS, the LTE system and the LTE-A system, for broadcasting multimedia contents such as TV programs, films, music, etc. Compared with the traditional unicast, the MBMS service (hereafter referred to both the MBMS service and/or the E-MBMS service) is provided in downlink only, and is broadcasted from the network to multiple (e.g., a specific group of) UEs via a point-to-multipoint transmission. Characteristic of the MBMS service enables the network to provide the MBMS service to unlimited number of UEs with a constant network load. In addition, a UE in the UMTS, the LTE system and/or the LTE-A system may receive the MBMS service inherently, and no additional hardware component is needed to be installed for the MBMS service. Thus, the MBMS service is attractive, considering both hardware cost and resource efficiency.

Multicast-broadcast single frequency network (MBSFN) is a communication channel defined for the MBMS service. In MBSFN transmission, signals from several antennas of potentially different base stations are combined in the UE. This combination makes MBSFN transmission different from unicast transmission, and makes the performance of MBSFN transmission difficult to be verified than unicast transmission. MBSFN transmission is unacknowledged. There is no feedback to the radio access network (RAN) which broadcasts the MBMS transmission, such as hybrid automatic repeat request (HARQ) or radio link control (RLC) acknowledgements, meaning that the RAN does not know whether the MBSFN transmissions are successfully received or not. Hence, it is difficult for an operator to understand the quality of MBMS services being delivered. Thus, the only way to verify and optimize MBSFN radio transmission is to do manual drive test.

Unfortunately, using manual drive tests for network optimization purposes is costly, and this contributes in environmental emission of $CO_2$ and more importantly, comes with a limitation in measuring places along a drive route which is generally not typical to where customers consume MBMS services.

Minimization of drive test (MDT) functionalities, including logged MDT and immediate MDT, are performed or logged by UEs to collect information (or called measurement logs) in the idle mode or connected mode, and report the information to the network, to reduce network maintenance costs for operators, ensure faster optimization cycle resulting in higher customer satisfaction, and help to reduce the carbon emission to protect the environment. According to 3GPP specifications, a logged measurement configuration message is utilized for configuring a UE to perform the MDT functionalities. However, it is not clear how to extend the MDT functionalities to support MBMS MDT function.

SUMMARY OF THE INVENTION

It is therefore an objective of the present invention to provide a method for handling a multimedia broadcast multicast service (MBMS) minimization of driver test (MDT) in a wireless communication system to solve the abovementioned problem.

An embodiment of the present invention discloses a method of handling an MBMS MDT for a network of a wireless communication system. The method comprises transmitting a first MBMS measurement configuration to instruct a first user equipment (UE) to perform an MBMS MDT operation; receiving a first MBMS measurement result and a first multicast-broadcast single frequency network (MBSFN) area identity (ID) which indicates that the first MBMS measurement result is generated for a first MBSFN area identified by the first MBSFN area ID, from the first UE; and processing the first MBMS measurement result according to the first MBSFN area ID.

An embodiment of the present invention further discloses a method of handling an MBMS MDT for a UE of a wireless communication system. The method comprises receiving an MBMS measurement configuration comprising an MBSFN area ID identifying an MBSFN area from a first network; and performing an MBMS MDT operation for the MBSFN area in response to reception of the MBMS measurement configuration comprising the MBSFN area ID identifying the MBSFN area.

An embodiment of the present invention further discloses a method of handling an MBMS MDT for a UE of a wireless communication system. The method comprises receiving an MBMS measurement configuration which instructs the UE to perform an MBMS MDT operation, from a first network of the wireless communication system; performing the MBMS MDT operation for an MBSFN area where the UE is receiving an MBMS service via an MBSFN transmission, in response to reception of the MBMS measurement configuration; and transmitting an MBMS measurement result generated by performing the MBMS MDT operation and an MBSFN area ID to a network of the wireless communication system, wherein the network is the first network or a second network of the wireless communication system.

These and other objectives of the present invention will no doubt become obvious to those of ordinary skill in the art after reading the following detailed description of the preferred embodiment that is illustrated in the various figures and drawings.

DETAILED DESCRIPTION

It is desirable to have automated solutions, to provide the ability for network operators to gather information such as radio measurements which are associated with customer UEs and use this information to assist network operation and optimization.

Figure 1:
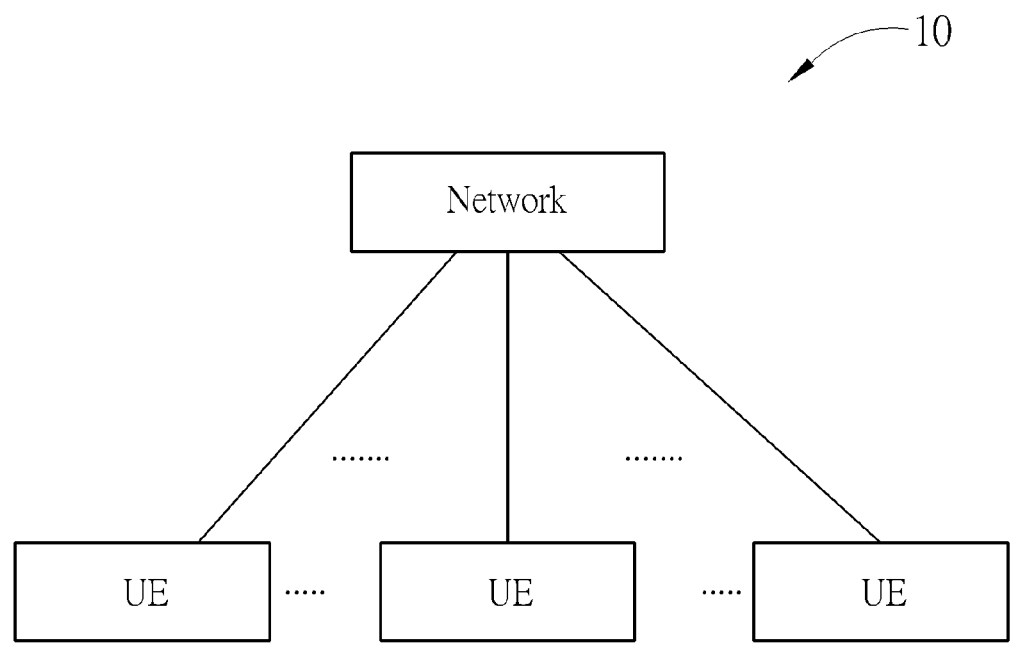
FIG. 1 is a schematic diagram of a wireless communication system according to an embodiment of the present invention.

Please refer to FIG. 1, which is a schematic diagram of a wireless communication system 10 according to an embodiment of the present invention. The wireless communication system 10 is briefly composed of a network and a plurality of user equipments (UEs). In FIG. 1, the network and the UEs are simply utilized for illustrating the structure of the wireless communication system 10. Practically, the network may be a universal terrestrial radio access network (UTRAN) comprising a plurality of Node-Bs (NBs) in a universal mobile telecommunications system (UMTS). Alternatively, the network may be an evolved UTRAN (E-UTRAN) comprising a plurality of evolved NBs (eNBs) and/or relays in a long term evolution (LTE) system, a LTE-Advanced (LTE-A) system or an evolution of the LTE-A system.

Furthermore, the network may also include both the UTRAN/E-UTRAN and a core network, wherein the core network includes network entities such as Mobility Management Entity (MME), Serving Gateway (S-GW), Packet Data Network (PDN) Gateway (P-GW), Self-Organizing Networks (SON) server, Radio Network Controller (RNC), multimedia broadcast multicast service (MBMS) gateway, Multi-cell/Multicast Coordination Entity (MCE) and/or Operation and Maintenance (O&M) entity, etc. In other words, after the network receives information transmitted by a UE, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. In addition, the information may be processed by both the UTRAN/E-UTRAN and the core network, and the decisions are made after coordination and/or cooperation are performed by the UTRAN/E-UTRAN and the core network. A UE may be a mobile phone, a laptop, a tablet computer, an electronic book or a portable computer system but is not limited. In addition, the network and the UE may be seen as a transmitter or a receiver depending on the transmission direction, e.g., for an uplink (UL), the UE is the transmitter and the network is the receiver, and for a downlink (DL), the network is the transmitter and the UE is the receiver. More specifically, for the network, the direction of the transmission is DL, and the direction of the reception is UL. For the UE, the direction of the transmission is UL, and the direction of the reception is DL.

Figure 2:
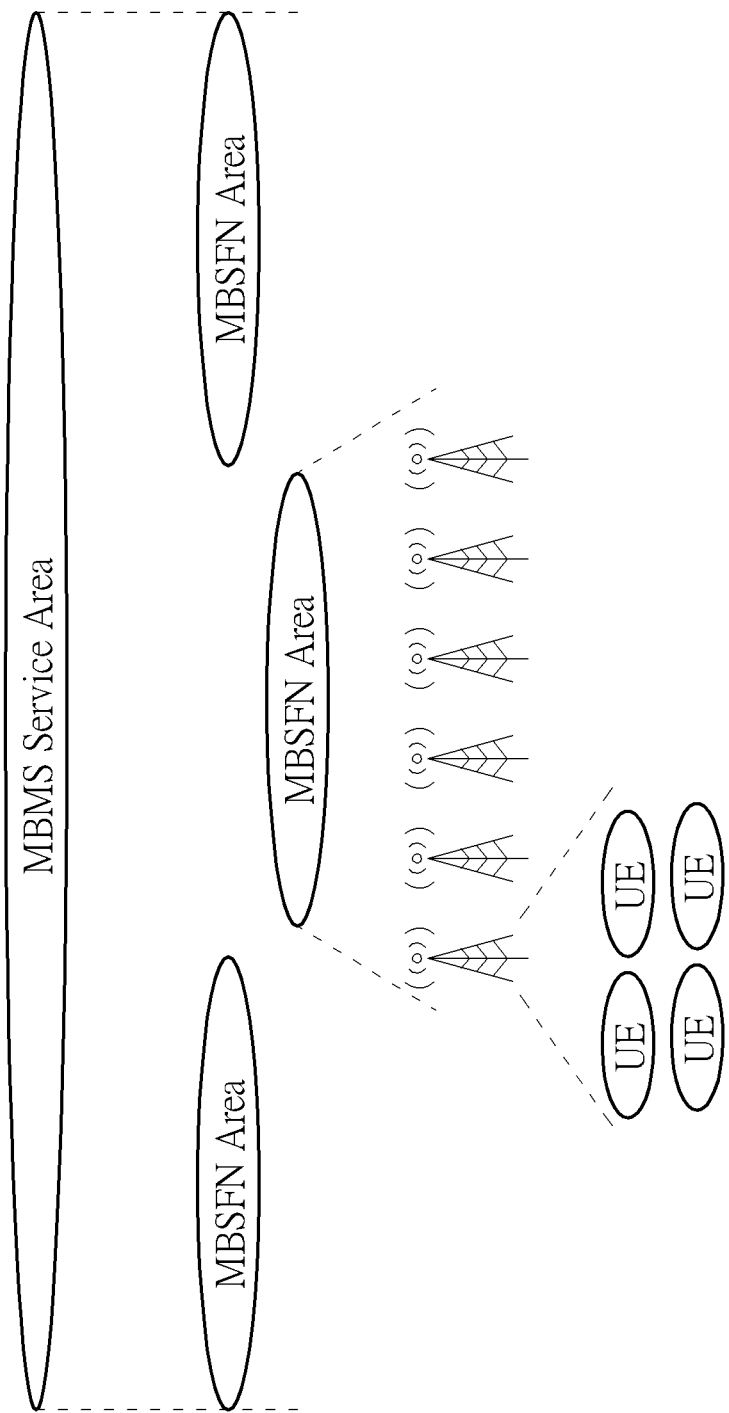
FIG. 2 is a schematic diagram of an MBSFN deployment in a wireless communication system.

Please refer to FIG. 2, which is a schematic diagram of a multicast-broadcast single frequency network (MBSFN) deployment in a wireless communication system such as the UMTS, the LTE system or the LTE-A system. The wireless communication system supports MBMS, which is a multimedia service performed by MBSFN. In detail, MBMS is a point-to-multipoint service in which data is transmitted from a single source entity to multiple recipients. Transmitting the same data to multiple recipients allows network resources to be shared. Cells participating in MBSFN transmission should be synchronized tightly in time. According to 3rd Generation Partnership Project (3GPP) specifications, an MBSFN synchronization area refers to an area of the network where all NBs or eNBs can be synchronized and perform MBSFN transmissions. Therefore, the MBMS service received by a UE may not be interrupted when the UE moves between different cells within the MBSFN synchronization area.

In addition, an MBMS service area refers to an area within which data of a specific MBMS session (or MBMS service) are sent, and an MBSFN area is an area consisting of a group of cells within an MBSFN synchronization area, which are coordinated to achieve an MBSFN transmission. In FIG. 2, the MBSFN synchronization area is capable of supporting one or more MBSFN area. On a given frequency layer, an eNB (or a Node-B) may belong to one or more MBSFN areas. An MBSFN transmission refers to a simulcast transmission technique realized by transmission of identical waveforms at the same time from multiple cells within an MBSFN area, which may be seen as a single transmission to a UE. That is, the NBs or eNBs in an MBSFN area may transmit the same data (i.e. MBMS) to multiple UEs simultaneously. The UE may only need to consider a subset of the MBSFN areas which are configured, i.e., when the UE knows which MBSFN area applies for the service(s) it is interested to receive.

Figure 3:
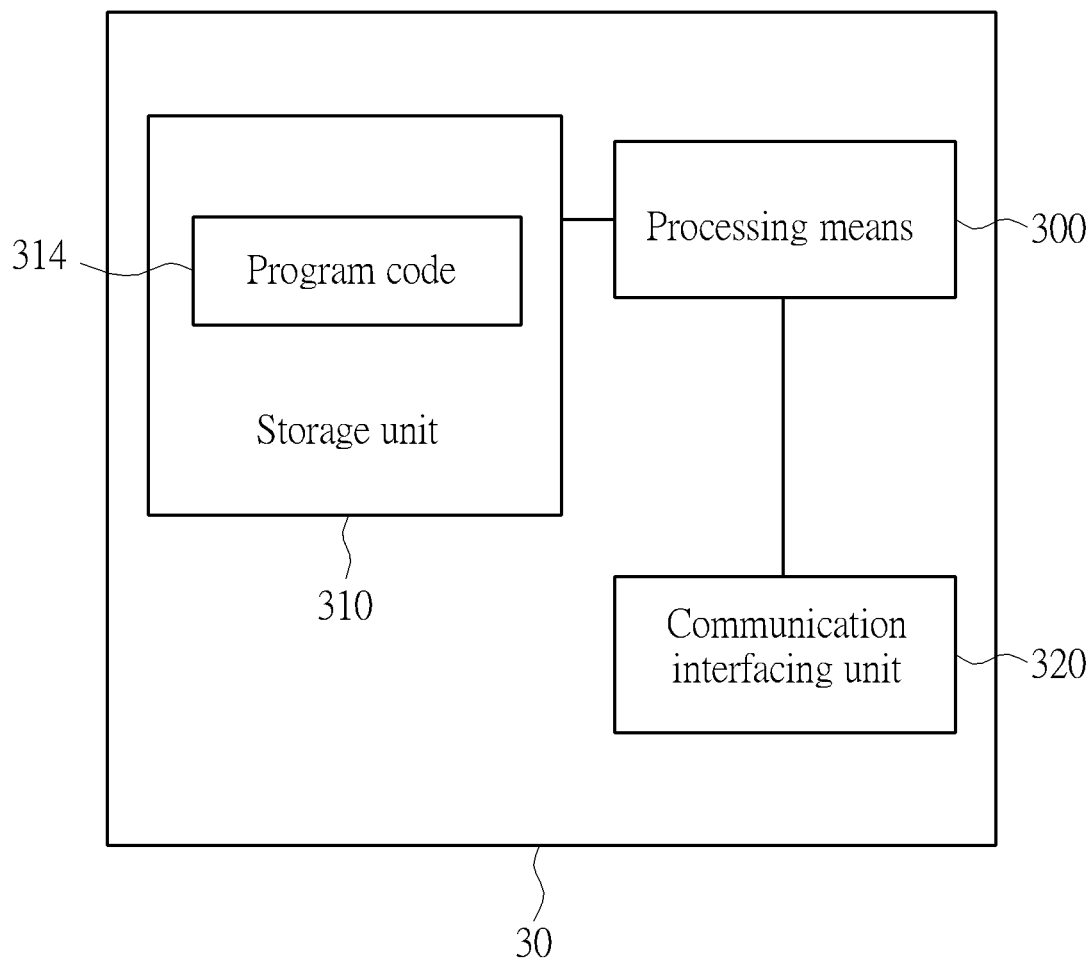
FIG. 3 is a schematic diagram of a communication device according to an embodiment of the present invention.

Please refer to FIG. 3, which is a schematic diagram of a communication device 30 according to an embodiment of the present invention. The communication device 30 may be utilized for realizing a UE or the network shown in FIG. 1, but is not limited herein. The communication device 30 may include a processing means 300 such as a microprocessor or Application Specific Integrated Circuit (ASIC), a storage unit 310 and a communication interfacing unit 320. The storage unit 310 may be any data storage device that stores a program code 314, accessed and executed by the processing means 300. Examples of the storage unit 310 include but are not limited to a subscriber identity module (SIM), read-only memory (ROM), flash memory, random-access memory (RAM), CD-ROM/DVD-ROM, magnetic tape, hard disk and optical data storage device. The communication interfacing unit 320 is preferably a transceiver and is used to transmit and receive signals (e.g., messages or packets) according to processing results of the processing means 300.

Figure 4:
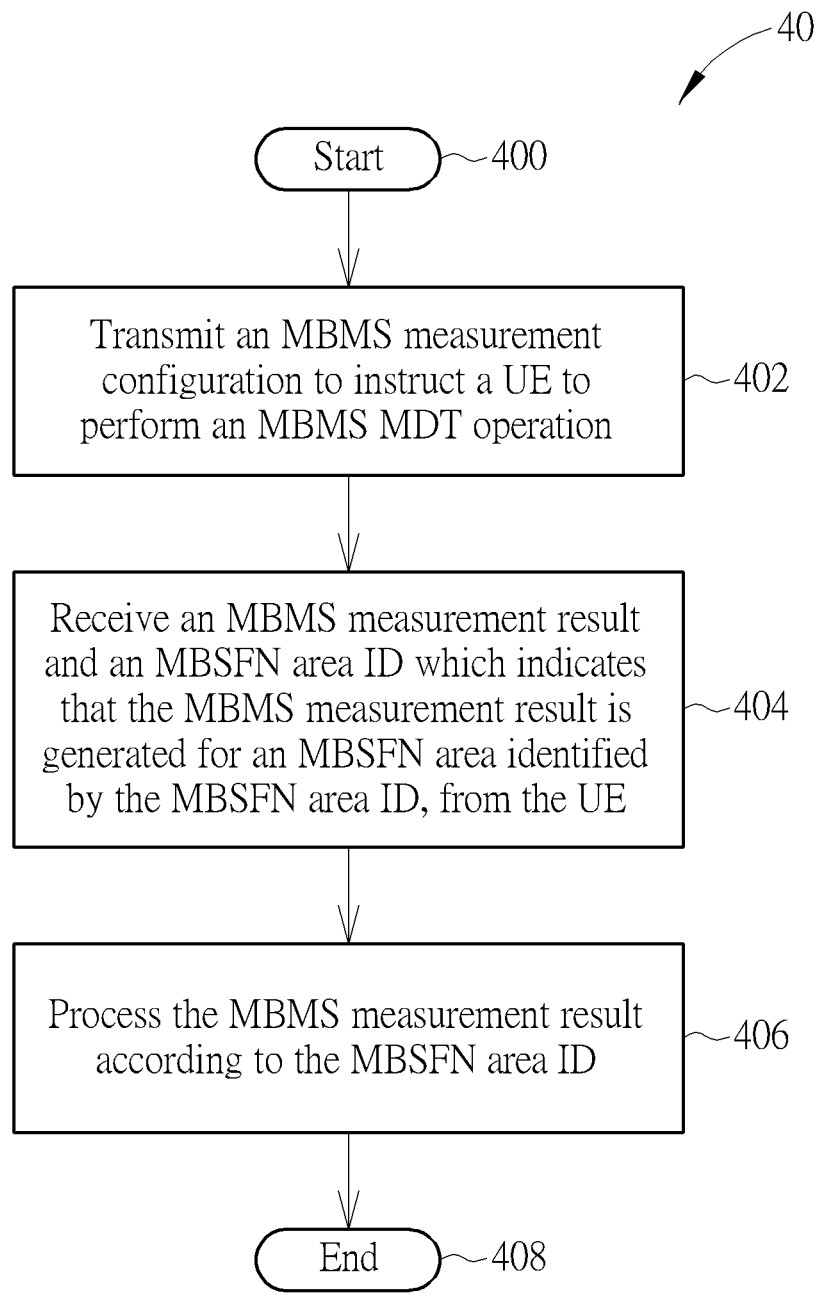
FIG. 4 is a flowchart of a process according to an embodiment of the present invention.

Please refer to FIG. 4, which is a flowchart of a process 40 according to an embodiment of the present invention. The process 40 may be utilized in a network of the wireless communication system 10, such as a Node-B of a UMTS system or an eNB of a LTE/LTE-A system, with the MBSFN deployment shown in FIG. 2, for handling MBMS minimization of drive test (MDT) operation. The process 40 may be compiled into the program code 314 and includes the following steps:

Step 400: Start.

Step 402: Transmit an MBMS measurement configuration to instruct a UE to perform an MBMS MDT operation.

Step 404: Receive an MBMS measurement result and an MBSFN area identity (ID) which indicates that the MBMS measurement result is generated for an MBSFN area identified by the MBSFN area ID, from the UE.

Step 406: Process the MBMS measurement result according to the MBSFN area ID.

Step 408: End.

In one embodiment, the network may transmit a first MBMS measurement configuration which instructs a first UE to perform an MBMS MDT operation, to the first UE (step 402). After the first UE performs the MBMS MDT operation, the network may receive a first MBMS measurement result and a first MBSFN area ID which indicates that the first MBMS measurement result is generated for a first MBSFN area identified by the first MBSFN area ID, from the first UE (step 404), and thus the network may process the first MBMS measurement result according to the first MBSFN area ID (step 406). In the above example, the network transmits the first MBMS measurement configuration to the first UE and receives the first MBMS measurement result and the first MBSFN area ID from the first UE; and in another example, in addition to cooperate with the first UE, the network by the process 40 may further transmit a second MBMS measurement configuration to a second UE (to instruct the second UE to perform the MBMS MDT operation) and receives a second MBMS measurement result and a second MBSFN area ID which indicates that the second MBMS measurement result is generated for a second MBSFN area identified by the second MBSFN area ID, from the second UE, and the network may process the second MBMS measurement result according to the second MBSFN area ID. An MBSFN area ID is broadcasted by the network so the UE receives the MBSFN area ID from the network.

In one embodiment, the network may receive a notification from the UE, notifying that there is an MBMS measurement result stored in the UE, and the network may transmit a request to the UE to request reporting of the MBMS measurement result stored in the UE.

In one embodiment, the MBMS measurement configuration that the network transmits may include the MBSFN area ID identifying the MBSFN area which the MBMS MDT operation (by the UE) is performed for. In another embodiment, the MBMS measurement configuration that the network transmits may include no MBSFN area ID. No matter whether the MBMS measurement configuration includes any MBSFN area ID, the UE may transmit an MBMS measurement result along with an MBSFN area ID identifying an MBSFN area which the MBMS MDT operation (by the UE) is performed for. Hence the network knows the MBMS measurement result is generated by the UE according to the MBMS MDT operation performed for the MBSFN area. The UE may transmit a plurality of MBMS measurement results and a plurality of MBSFN area IDs, and each of the MBSFN area IDs identifies an MBSFN area which at least one of the plurality of MBMS measurement results is generated for.

Figure 5:
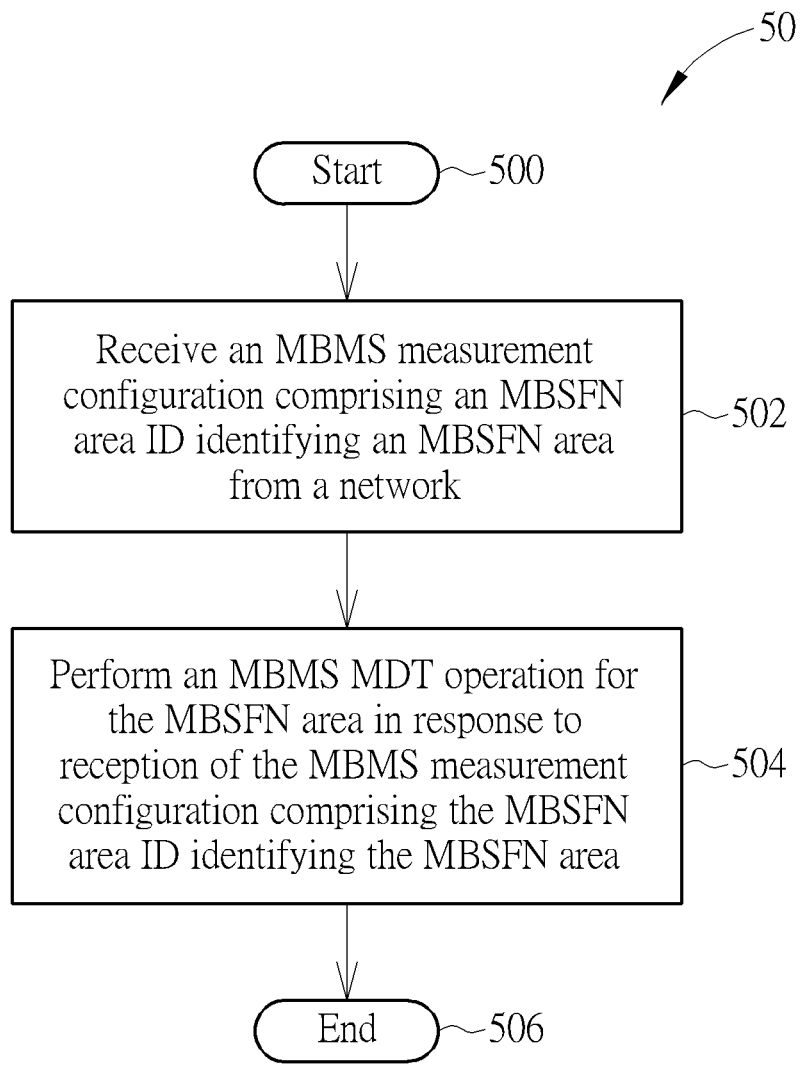
FIG. 5 is a flowchart of a process according to an embodiment of the present invention

Please refer to FIG. 5, which is a flowchart of a process 50 according to an embodiment of the present invention. The process 50 may be utilized in a UE of the wireless communication system 10 with the MBSFN deployment shown in FIG. 2, for handling MBMS MDT operation. In one embodiment, the UE implemented with the process 50 is capable to communicate with a network implemented with the process 40 and receive MBMS service from the network. The process 50 may be compiled into the program code 314 and includes the following steps:

Step 500: Start.

Step 502: Receive an MBMS measurement configuration comprising an MBSFN area ID identifying an MBSFN area from a network.

Step 504: Perform an MBMS MDT operation for the MBSFN area in response to reception of the MBMS measurement configuration comprising the MBSFN area ID identifying the MBSFN area.

Step 506: End.

According to the process 50, the UE may receive an MBMS measurement configuration from the network (step 502), wherein the MBMS measurement configuration comprises an MBSFN area ID identifying an MBSFN area. In response to reception of the MBMS measurement configuration, the UE may perform an MBMS MDT operation for the MBSFN area (step 504). MBMS MDT operation can be named different, such as MBSFN logged measurement or any other similar.

More specifically, the step of performing the MBMS MDT operation (step 504) for the MBSFN area includes to perform an MBMS measurement for the MBSFN area identified by the MBSFN area ID, for generating an MBMS measurement result, and to store the MBMS measurement result, i.e. logging. It should be noted that in general cases, the UE may perform the MBMS measurement for the MBSFN area only if the UE receives the MBMS measurement configuration including the MBSFN area ID identifying the MBSFN area and if the UE is receiving the MBMS service provided via MBSFN transmission, but this condition is not a limit to the embodiments of the present invention. In another case, the UE may perform the MBMS measurement for the MBSFN area as long as the UE receives the MBMS measurement configuration including the MBSFN area ID identifying the MBSFN area, regardless of whether the UE is receiving the MBMS service via MBSFN transmission or not. In another case, the UE may perform the MBMS measurement as along as the UE receives an MBMS service and generates an MBMS measurement result. In this case, the step of performing the MBMS MDT operation may include storing the MBMS measurement result, i.e. logging.

In one embodiment, after the UE has the stored MBMS measurement result, the UE may further transmit a notification to the network, for notifying that there is an MBMS measurement result stored in the UE. The UE may further transmit the stored MBMS measurement result for the MBSFN area to the network after receiving a request from the network. Note that the network that transmits the request may be the same as or different from the network that transmits the MBMS measurement configuration to the UE. For example, the UE may receive the MBMS measurement configuration from a first network (e.g., a first eNB), and transmit the MBMS measurement result to a second network (e.g., a second eNB) which transmits the request to the UE. In another example, the UE may receive the MBMS measurement configuration from the first network and transmit the MBMS measurement result to the first network if the first network transmits the MBMS measurement configuration and also transmits the request to the UE.

In another embodiment, the UE may transmit not only the stored MBMS measurement result corresponding to the MBSFN area where the MBMS measurement is performed for, but also the MBSFN area ID identifying the MBSFN area, to the second network (different from the first network that transmits the MBMS measurement configuration to the UE).

Please note that, the UE may receive the MBMS service via MBSFN transmission when the UE does not receive MBMS measurement configuration yet, and the UE may perform MBMS measurement anytime when receiving MBMS service(s). In one embodiment, once the UE receives an MBMS service belonging to a first MBSFN area, the UE may perform MBMS measurement for the first MBSFN area and does not store the MBMS measurement result until the UE receives an MBMS measurement configuration including a first MBSFN area ID identifying the first MBSFN area. Later, when the UE receives the MBMS measurement configuration including the first MBSFN area ID, the UE then stores the MBMS measurement result corresponding to the first MBSFN area in the storage unit of the UE.

As mentioned above, the UE may perform MBMS measurement anytime when receiving MBMS service(s). For example, the network may instruct the UE to perform MBMS measurement and store an MBMS measurement result every 10 milliseconds. Alternatively, the network may instruct the UE to perform MBMS measurement for every 5 MBSFN subframes in which the UE receives the MBMS service(s), and store the average value of the measurement results of every 5 MBSFN subframes. The UE then transmits the stored measurement result to the network.

Please note that the network may configure different MBSFN area IDs for different UEs according to locations of the UEs or MBMS services subscribed by the UEs. For example, a first UE may subscribe MBMS service(s) belonging to a first MBSFN area but not subscribe MBMS service(s) belonging to a second MBSFN area. A second UE may subscribe MBMS service(s) belonging to the second MBSFN area but not subscribe MBMS service(s) belonging to the first MBSFN area. In such a condition, the network may configure the first UE with a first MBMS measurement configuration including a first MBSFN area ID identifying the first MBSFN area, and configure the second UE with a second MBMS measurement configuration including a second MBSFN area ID identifying the second MBSFN area, where the first MBSFN area ID and the second MBSFN area ID are different.

In a further embodiment, the network may configure a UE with an MBMS measurement configuration including more than one MBSFN area ID. The UE may perform an MBMS MDT operation for each MBSFN area in response to the reception of the MBMS measurement configuration including each corresponding MBSFN area ID. More specifically, the UE may perform the MBMS measurement for each MBSFN area identified by the MBSFN area IDs included in the MBMS measurement configuration and store the MBMS measurement result corresponding to each MBSFN area and the UE may transmit the stored MBMS measurement results to the network.

The UE may receive MBMS services simultaneously from a first MBSFN area and a second MBSFN area. In an embodiment, for a condition that the UE may perform MBMS measurement after the UE receives an MBMS measurement configuration including only one MBSFN area ID and the MBSFN area ID is corresponding to the first MBSFN area, the UE may perform MBMS measurement for the first MBSFN area and store the MBMS measurement result corresponding to the first MBSFN area; the MBMS measurement is not performed for the second MBSFN area and no MBMS measurement result corresponding to the second MBSFN area is generated and stored. In this case, the MBMS measurement for the second MBSFN area is regarded as not requested by the network.

In another embodiment, for a condition that the UE may perform MBMS measurement once an MBMS service is received by the UE, the UE may perform measurement on both of the first MBSFN area and the second MBSFN area. Later, if the UE receives an MBMS measurement configuration including only one MBSFN area ID and the MBSFN area ID is corresponding to the first MBSFN area, the UE may store the MBMS measurement result corresponding to the first MBSFN area and not store the MBMS measurement result corresponding to the second MBSFN area. In other words, the MBMS measurement for the second MBSFN area may be still performed, but the MBMS measurement result for the second MBSFN area may be discarded (e.g., not stored in the UE).

In several conditions, when performing an MBSFN transmission, the network may detect how many UEs are receiving the MBSFN transmission. If there are fewer number of UEs receiving the MBSFN transmission, the network may stop the MBSFN transmission and change to apply unicast transmissions to respective UEs, which allows the network to release several resources which originally used for MBSFN transmission to be used for general data transmissions. In such a condition, the MBSFN transmission is changed to a unicast transmission. The network may inform the UE of this change via the system information. Accordingly, the UE may stop the reception of MBMS service via the MBSFN transmission and establish a radio resource control (RRC) connection to the network to receive the MBMS service via the unicast. Note that when the UE stops receiving the MBMS service via MBSFN transmission, the UE may stop performing the MBMS measurement.

In an embodiment, for a condition that the UE may perform an MBMS measurement when the UE is receiving an MBMS service belonging to a first MBSFN area identified by a first MBSFN area ID, as long as the UE stops receiving the MBMS service belonging to the first MBSFN area identified by the first MBSFN area ID, the UE may stop performing the MBMS measurement. For example, the UE may stop receiving any MBMS service(s) belonging to the first MBSFN area, or the UE may change to receive an MBMS service belonging to a second MBSFN area identified by a second MBSFN area ID. In such a condition, the UE may stop performing the MBMS measurement.

Preferably, the UE may store an MBMS measurement result corresponding to an MBSFN area only when the MBMS measurement result for the MBSFN area is requested by the network. In such a condition, the memory of the UE will be used for the measurement data requested by the network. In contrast, if all MBMS measurement results for every MBSFN area providing MBMS services are stored by the UE to be reported to the network, a great amount of memory of the UE may be occupied by the measurement data even if several of these measurement data are useless data, resulting in worse performance of the UE.

The MBMS measurement result may be, for example, a measurement log. If there is/are measurement log(s) stored in the memory, the UE may inform the network (e.g., an eNB) of information indicating the existence of measurement log(s) via a RRC message or another uplink message. After the network receives this indication, the network may request the UE to report the measurement log(s) via another RRC message at a specific time. The UE then transmits the measurement log(s) to the network.

Please note that the MBMS measurement result may include at least one of an evolved universal terrestrial radio access (E-UTRA) carrier MBSFN received signal strength indicator (RSSI), an MBSFN signal-to-noise ratio (SNR), a reference signal received power (RSRP) of an MBSFN signal, an MBSFN reference signal received quality (RSRQ) and a block error rate (BLER). The format of the MBMS measurement result may be indicated to the UE by the network via the MBMS measurement configuration. That is, the network may transmit the MBMS measurement configuration to configure the MBMS measurement result in form of metrics including at least one of the E-UTRA carrier MBSFN RSSI, the MBSFN SNR, the RSRP of the MBSFN signal, the MBSFN RSRQ and the BLER. For example, if the network makes a request that the UE should report the MBMS measurement result in form of RSRP, the UE may report the value of RSRP accordingly. In general, the format of the MBMS measurement result stored in the UE may be the same as the format requested by the network, so the UE may report the MBMS measurement result directly. In some embodiment, the format of the MBMS measurement result stored in the UE may be different from the format requested by the network. For example, if the network transmits a request that the UE should report the MBMS measurement result in form of RSRP, the UE may store a double RSRP value in its memory, and report the RSRP value as the MBMS measurement result after dividing the stored value by two.

It should be noted that the UE may not report the MBMS measurement result to the network immediately after receiving the MBMS measurement configuration. Instead, the UE may store the MBMS measurement result when receiving the MBMS measurement configuration, and report the MBMS measurement result after receiving the request from the network. For example, after the UE receives the MBMS measurement configuration from a first network and the UE moves from the first network to a second network before transmitting the MBMS measurement result, the UE then transmits the MBMS measurement result to the second network.

Furthermore, if the second network obtains the MBMS measurement result from the UE, the second network may not know which MBSFN area the MBMS measurement result is used for. In such a condition, the UE may further transmit the MBSFN area ID identifying an MBSFN area to the second network, in order to indicate that the MBMS measurement result is generated corresponding to the MBSFN area identified by the MBSFN area ID. The second network either processes the MBMS measurement result according to the MBSFN area ID, or transmits the MBMS measurement result and the MBSFN area ID to a network entity. The network entity is a centralized node responsible for collecting and processing MBMS measurement results from different UEs and may be a standalone node or may be located in an MCE, an O&M entity or an MME.

If the second network or the network entity does not receive the MBSFN area ID from the UE, the second network or the network entity may still process the MBMS measurement result and associate the MBMS measurement result to the MBSFN area ID via a cell global identity of a cell in which the UE performs MBMS measurement. The UE may transmit the cell global identity to indicate the cell which the MBMS measurement result is generated from signals measured from. If the cell in which the UE performs MBMS measurement belongs to only one MBSFN area, the second network or the network entity may derive the MBSFN area ID of this MBSFN area from the cell global identity.

For example, the second network or the network entity may have mapping information (e.g., a mapping table) between the cell global identity and the MBSFN area ID. The second network or the network entity may look up the mapping information to use the cell global identity to find the MBSFN area ID.

When the second network or the network entity gets the MBSFN area ID either from the UE or derived by itself, the second network or the network entity may process the MBMS measurement results by classifying and analyzing the MBMS measurement results according to the MBSFN area ID. Based on the analysis, the second network or the network entity optimizes the MBSFN transmission for the MBSFN area. For example, based on the analysis, the second network or the network entity may configure more cells to perform MBSFN transmission to enhance MBMS quality within an MBSFN area if the signal quality within this MBSFN area is weaker; or the second network or the network entity may configure fewer cells to perform MBSFN transmission within an MBSFN area if the MBMS quality within this MBSFN area is good enough, in order to save electricity power. The second network or the network entity may further increase MBSFN transmission power of a cell for an MBSFN area if the signal quality within this MBSFN area is weaker in the cell; or decrease MBSFN transmission power of a cell for an MBSFN area if the signal quality within this MBSFN area is good enough in the cell.

Please note that there are some cells belonging to more than two MBSFN areas simultaneously. For each of these cells, at least one subframe of the cell may be used for a first MBSFN area, and at least one of other subframes of the cell may be used for a second MBSFN area. If an MBSFN area ID included in the MBMS measurement configuration is used for the first MBSFN area, the UE may perform the MBMS measurement by measuring the MBSFN subframe(s) allocated to the first MBSFN area, which is identified by the MBSFN area ID. If an MBSFN subframe for the first MBSFN area is specified to be measured, the UE may measure a reference signal in the MBSFN subframe, to determine the measurement values (e.g. the MBSFN SNR, MBSFN RSSP and/or MBSFN RSSQ) of the first MBSFN area. The MBMS measurement may be performed by the UE in an idle mode or a connected mode, which should not be a limitation of the present invention and should be different from the logged MDT and immediate MDT in the prior art.

Since the network knows that which subframes are used for MBSFN transmission of the first MBSFN area, the MBMS measurement configuration transmitted by the network may include a subframe configuration indicating which subframe to be measure. The MBMS measurement configuration may further include a channel configuration indicating which channel such as Multicast Control Channel (MCCH) or Multicast Traffic Channel (MTCH) to be measured, and/or an MBMS service configuration indicating an MBMS service to be measured. The UE may perform MBMS measurement and store an MBMS measurement result on the channel according to the channel configuration and/or on subframe(s) where the MBMS service is received according to the MBMS service configuration. In an embodiment, the network may transmit the MBMS measurement configuration to the UE after receiving capability information from the UE, wherein the capability information indicates that the UE supports an MBMS measurement capability. In other words, if a UE does not support the MBMS measurement capability, the network may not transmit the MBMS measurement configuration to the UE to instruct the UE to enable the capability to perform the MBMS MDT operation in response to receiving the MBMS service. The MBMS measurement capability may be contained in a UE capability information message. The network may transmit a UE capability enquiry message to the UE, and the UE may transmit the UE capability information message in response to reception of the UE capability enquiry message.

Please note that the MBMS measurement configuration may be included in a logged measurement configuration message. In the prior art, the logged measurement configuration message is used for transmitting the configuration of logged MDT (which is not MBMS MDT), and the present invention may configure the logged measurement configuration message to further transmit the MBMS measurement configuration of MBMS MDT. More specifically, if the logged measurement configuration message can also be used for transmitting the MBMS measurement configuration, the logged measurement configuration message may include MBMS measurement configuration which may include an MBSFN area ID. If the MBMS measurement configuration does not include any MBSFN area ID, the network will require that the UE performs MBMS measurements on any MBSFN area where the UE is receiving any MBMS service. The UE stores the MBMS measurement results and an MBSFN area ID corresponding to an MBSFN area when the UE is receiving any MBMS service in the MBSFN area. The MBMS measurement configuration may further include carrier frequency information indicating the carrier frequency on which the UE performs an MBMS measurement.

However, according to 3GPP TS 36.331 v11.6.0, section 5.6.6.3, the UE shall discard the logged measurement configuration as well as the logged measurement information specified in section 5.6.7 upon receiving a new logged measurement configuration message. This means that the UE may discard the logged measurement configuration and the corresponding measurement result (or the MBMS measurement configuration and the MBMS measurement result) for the logged measurement configuration message received previously when the UE receives a new logged measurement configuration message. If a UE is capable of both MBMS MDT and logged MDT functionalities, the UE should be able to store the MBMS measurement result and logged MDT measurement result simultaneously. In such a condition, the information element for MBMS measurement configuration should be exclusive of the information element for logged measurement configuration, i.e., LoggedMeasurementConfiguration-r10-IEs, in order to prevent the MBMS measurement result from being discarded when the UE receives a logged measurement configuration message having the information element LoggedMeasurementConfiguration-r10-IEs, or prevent the logged MDT measurement result from being discarded when the UE receives a logged measurement configuration message having the MBMS measurement configuration. For example, a UE may receive a logged measurement configuration message including a logged measurement configuration (i.e., LoggedMeasurementConfiguration-r10-IEs) and store a logged MDT measurement result accordingly. Then, if the UE receives a logged measurement configuration message including an MBMS measurement configuration (e.g., LoggedMeasurementConfiguration-r12-IEs), the UE may store the MBMS measurement result without discarding the previously stored logged MDT measurement result; that is, the UE may store the MBMS measurement result and the logged MDT measurement result simultaneously.

Alternatively, the MBMS measurement configuration may be included in a RRC message other than the logged measurement configuration message. If the UE receives a RRC message including the MBMS measurement configuration where the RRC message is different from the logged measurement configuration message, the UE may not discard the previously stored logged MDT measurement result.

Those skilled in the art should readily make combinations, modifications and/or alterations on the abovementioned description and examples. The abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 30.

To sum up, the present invention provides a method of handling MBMS MDT in a wireless communication system. The method allows the network to configure UEs to perform MBMS measurement on specific MBSFN area(s) via the MBMS measurement configuration. When receiving the MBMS measurement configuration, the UE may enable an MBMS MDT operation for the MBSFN area(s) specified by the network. More specifically, the UE may store the MBMS measurement result(s) for the MBSFN area (s) specified by the network and then transmit the MBMS measurement result(s) to the network, in order to realize MDT for MBMS services.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling a multimedia broadcast multicast service (MBMS) minimization of driver test (MDT) for a network of a wireless communication system, the method comprising:
   transmitting a first MBMS measurement configuration to instruct a first user equipment (UE) to perform an MBMS MDT operation after receiving capability information indicating that the first UE supports an MBMS measurement capability from the first UE;
   receiving a first MBMS measurement result and a first multicast-broadcast single frequency network (MBSFN) area identity (ID) which indicates that the first MBMS measurement result is generated for a first MBSFN area identified by the first MBSFN area ID, from the first UE; and
   processing the first MBMS measurement result according to the first MBSFN area ID.

2. The method of claim 1, wherein the first MBMS measurement configuration comprises the first MBSFN area ID.

3. The method of claim 1 further comprising:
   transmitting a second MBMS measurement configuration to instruct a second UE to perform the MBMS MDT operation;
   receiving a second MBMS measurement result and a second MBSFN area ID which indicates that the second MBMS measurement result is generated for a second MBSFN area identified by the second MBSFN area ID, from the second UE; and
   processing the second MBMS measurement result according to the second MBSFN area ID.

4. A method of handling a multimedia broadcast multicast service (MBMS) minimization of driver test (MDT) for a user equipment (UE) of a wireless communication system, the method comprising:

receiving an MBMS measurement configuration comprising a multicast-broadcast single frequency network (MBSFN) area identity (ID) identifying an MBSFN area from a first network; and performing an MBMS MDT operation for the MBSFN area in response to reception of the MBMS measurement configuration comprising the MBSFN area ID identifying the MBSFN area;

wherein the step of performing the MBMS MDT operation for the MBSFN area in response to reception of the MBMS measurement configuration comprising the MBSFN area ID identifying the MBSFN area comprises:

performing an MBMS measurement for the MBSFN area identified by the MBSFN area ID for generating an MBMS measurement result;

storing the MBMS measurement result for the MBSFN area identified by the MBSFN area ID; and transmitting a notification to the first network for notifying that the UE has the stored MBMS measurement result for the MBSFN area identified by the MBSFN area ID.

5. The method of claim 4, further comprising:
transmitting the stored MBMS measurement result to the first network or a second network in response to a request sent by the first network or the second network.

6. The method of claim 4, further comprising:
transmitting the stored MBMS measurement result and the MBSFN area ID to the first network or a second network in response to a request sent by the first network or the second network.

7. The method of claim 4, wherein the MBMS measurement result comprises at least one of an evolved universal terrestrial radio access (E-UTRA) carrier MBSFN received signal strength indicator (RSSI), an MBSFN signal-to-noise ratio (SNR), a reference signal received power (RSRP) of an MBSFN signal, an MBSFN reference signal received quality (RSRQ) and a block error rate (BLER).

8. The method of claim 7, wherein the MBMS measurement configuration configures the MBMS measurement result in form of metrics comprising at least one of the E-UTRA carrier MBSFN RSSI, the MBSFN SNR, the RSRP of the MBSFN signal, the MBSFN RSRQ and the BLER.

9. The method of claim 4, further comprising:
stopping performing the MBMS measurement for the MBSFN area, when the UE stops receiving the MBMS service belonging to the MBSFN area transmitted by MBSFN transmission or changes to receive the MBMS service belonging to the MBSFN area transmitted by a unicast.

10. The method of claim 4, where the step of performing the MBMS measurement for the MBSFN area further comprises:
performing the MBMS measurement by measuring at least one MBSFN subframe allocated to the MBSFN area identified by the MBSFN area ID, wherein measuring the at least one MBSFN subframe allocated to the MBSFN area comprises measuring a reference signal in the at least one MBSFN subframe.

11. A method of handling a multimedia broadcast multicast service (MBMS) minimization of driver test (MDT) for a user equipment (UE) of a wireless communication system, the method comprising:

receiving an MBMS measurement configuration which instructs the UE to perform an MBMS MDT operation, from a first network of the wireless communication system;

performing the MBMS MDT operation for a multicast-broadcast single frequency network (MBSFN) area where the UE is receiving an MBMS service via MBSFN transmission, in response to reception of the MBMS measurement configuration;

transmitting an MBMS measurement result generated by performing the MBMS MDT operation and an MBSFN area identity (ID) to a network of the wireless communication system, wherein the network is the first network or a second network of the wireless communication system; and transmitting a notification to the first network for notifying that the UE has the stored MBMS measurement result for the MBSFN area identified by the MBSFN area ID.

12. The method of claim 11, wherein the MBMS measurement configuration transmitted from the first network comprises the MBSFN area ID.

13. The method of claim 11, wherein the step of performing the MBMS MDT operation for the MBSFN area in response to reception of the MBMS measurement configuration comprises:

performing an MBMS measurement for the MBSFN area; and storing the MBMS measurement result for the MBSFN area.

14. The method of claim 13, further comprising:
stopping performing the MBMS measurement for the MBSFN area, when the UE stops receiving the MBMS service belonging to the MBSFN area via MBSFN transmission or changes to receive the MBMS service by a unicast.

15. The method of claim 13, where the step of performing the MBMS measurement for the MBSFN area further comprises:
performing the MBMS measurement by measuring at least one MBSFN subframe allocated to the MBSFN area identified by the MBSFN area ID, wherein measuring the at least one MBSFN subframe allocated to the MBSFN area comprises measuring a reference signal in the at least one MBSFN subframe.

16. The method of claim 11, wherein the MBMS measurement configuration is sent to the UE by the first network after the first network receives capability information indicating that the UE supports an MBMS measurement capability from the UE.

* * * * *